Nov. 4, 1924.  1,513,915
K. E. KUNS
VENDING MACHINE
Filed March 14, 1921  2 Sheets-Sheet 2
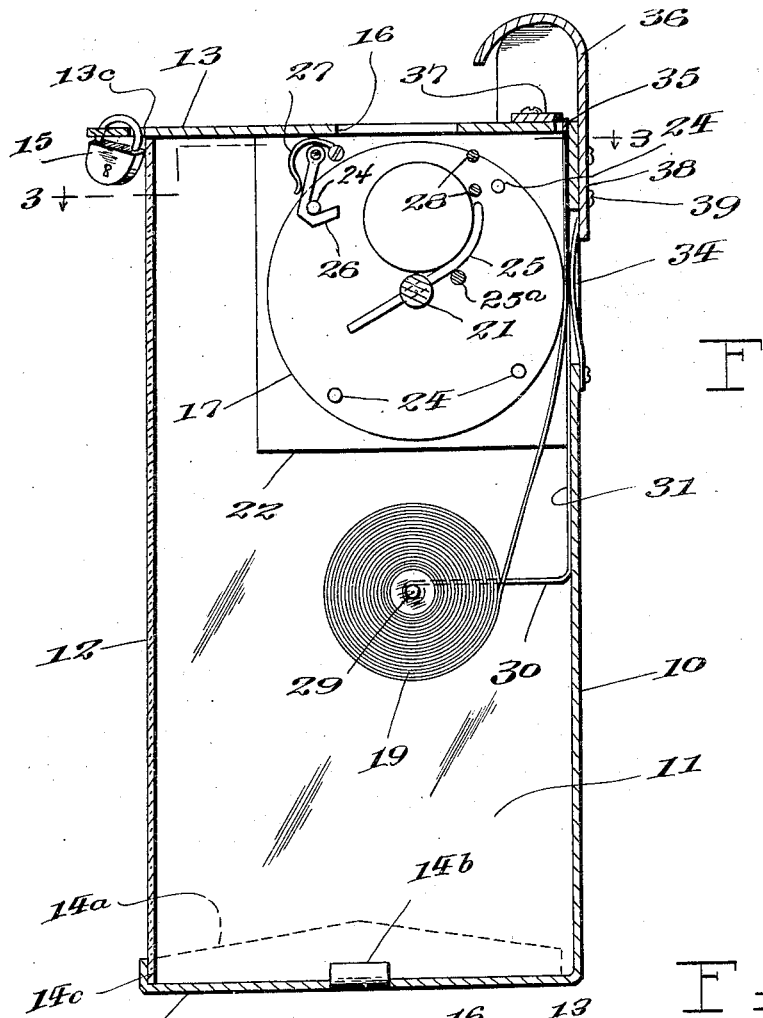
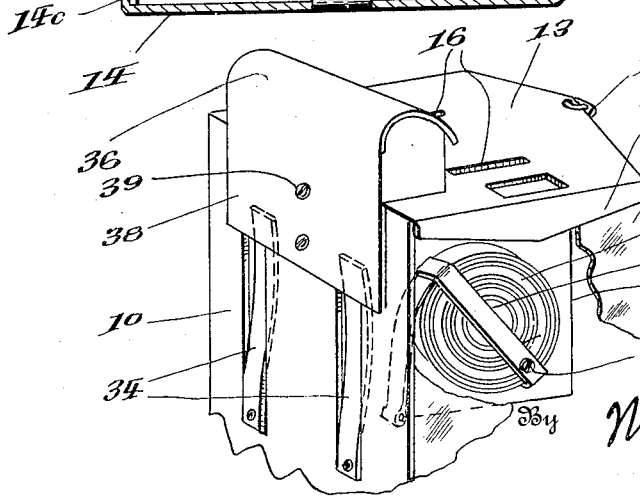
Inventor:
K. E. Kuns.
Attorneys.

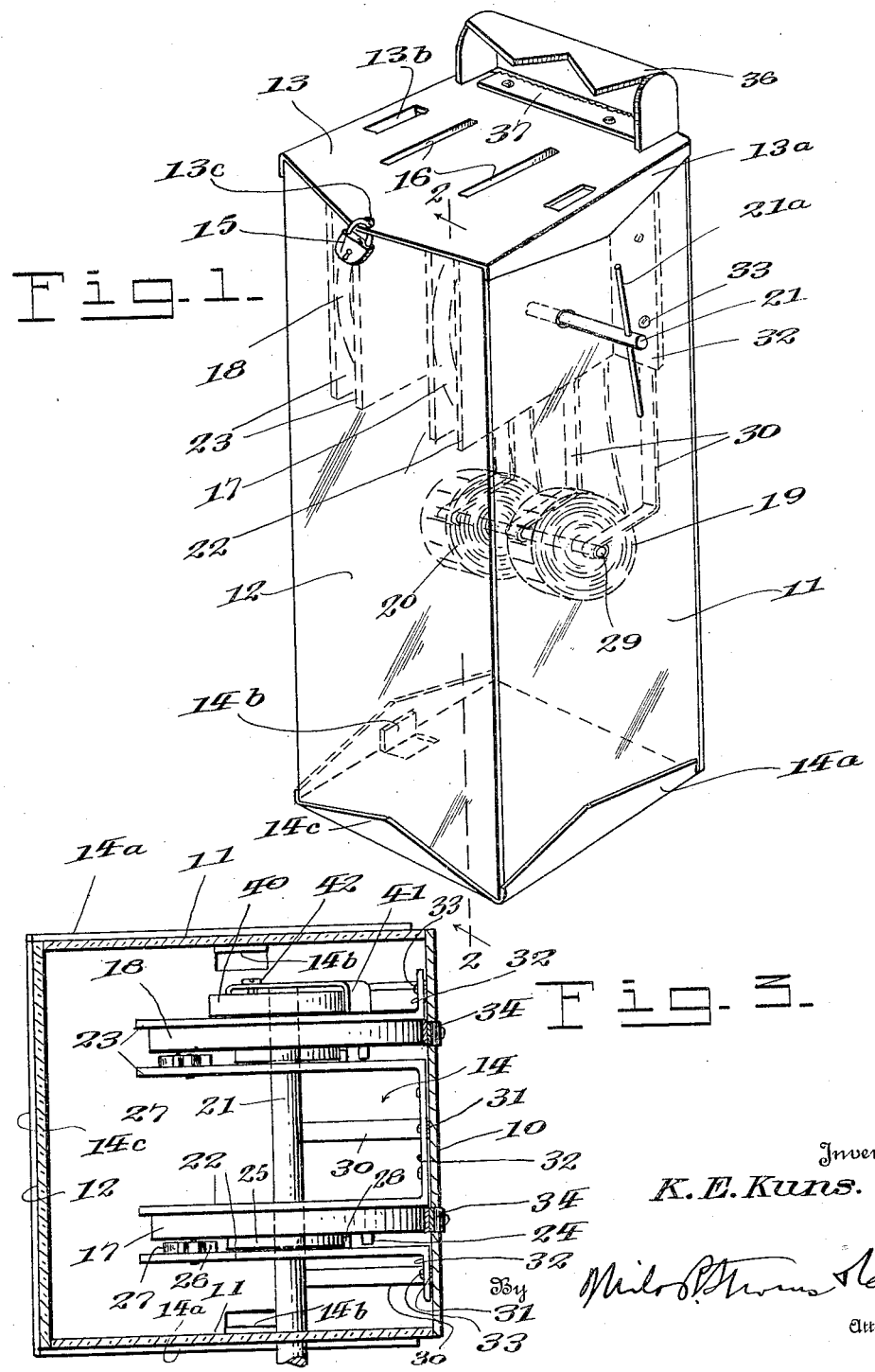

Patented Nov. 4, 1924.

1,513,915

UNITED STATES PATENT OFFICE.

KENNETH ELROY KUNS, OF CHICAGO, ILLINOIS.

VENDING MACHINE.

Application filed March 14, 1921. Serial No. 451,979.

*To all whom it may concern:*

Be it known that I, KENNETH E. KUNS, citizen of the United States, residing at Chicago, in the county of Cook and State of Illinois, have invented new and useful Improvements in Vending Machines, of which the following is a specification.

The vending machine which is the subject matter of the present application for patent has been designed more particularly for vending postage stamps, and it is the object of the invention to provide a very simple and efficient mechanism for this purpose, the same consisting in a novel combination and arrangement of parts to be hereinafter described and claimed.

In order that the invention may be better understood, reference is had to the accompanying drawings, forming a part of this specification, and in said drawings, Figure 1 is a perspective view of the machine;

Fig. 2 is a vertical section on the line 2—2 of Fig. 1;

Fig. 3 is a horizontal section on the line 3—3 of Fig. 2, and

Fig. 4 is a perspective view showing the top portion of the machine viewed from the rear.

Referring specifically to the drawings, the casing which encloses and supports the mechanism comprises a back 10, sides 11, a front 12, a top 13 and a bottom 14. This casing is rectangular and its front and sides are made of glass, whereas its back is a metal plate having forward top and bottom bends to form the top and bottom of the casing. The casing top has downturned marginal flanges 13$^a$ at its sides, and the casing bottom has upstanding marginal flanges 14$^a$ at its sides. Facing the flanges 13$^a$, and spaced inwardly therefrom, are downturned flanges 13$^b$ which are punched out of the casing top, and the casing bottom has similar, but upstanding flanges 14$^b$. The sheets of glass forming the casing sides 11 seat between the casing top and bottom, and between the aforementioned flanges thereof, the latter preventing lateral displacement. The sheet of glass forming the front 12 of the casing is then placed between the casing top and bottom to seat against the front vertical edges of the casing sides, and as the latter have their rear vertical edges abutting against the casing back wall 10, they are securely held in place. The casing bottom has a front upstanding marginal flange 14$^c$ behind which the sheet 12 seats. The casing top extends a short distance beyond the plane of the casing front 12 and has an aperture 13$^c$ to receive a padlock 15, whereby the casing front is locked in place. Upon removing the padlock, the casing front can be taken off so that access to the interior of the casing, for removal of the coins therefrom, may be had.

The stamps to be delivered by the machine are in the form of a strip which is wound on a roll from which the strip is unwound by a rotary feed wheel. The drawings show two rolls of stamp strips, one roll containing two-cent stamps and the other one-cent stamps. The apparatus is designed to be operated by a five-cent piece, to deliver two stamps of the two-cent denomination or four stamps of the one-cent denomination. Each stamp roll has a separate feed wheel, and the casing top 13 has two coin slots 16, one for each feed wheel.

The feed wheel for the two-cent stamps is shown at 17, and the feed wheel for the one cent stamps at 18. The roll of two-cent stamps is shown at 19, and the roll of one cent stamps at 20. The feed wheels 17 and 18 are below the respective coin slots 16, and their peripheries are milled to obtain a firm grip on the stamp strips and thus assure the feed thereof. The feed wheels are loose on an actuator shaft 21 having an operating handle 21$^a$ at one end on the outside of the casing.

The shaft 21 is supported by two pairs of bearing plates, one pair being denoted by the reference character 22, and the other pair by the reference character 23. These plates are laterally spaced and secured to the back 10 of the casing and they project forwardly therefrom. The feed wheel 17 is located between one pair of plates and the feed wheel 18 between the other pair.

The feed wheel 17 carries four equidistant pins 24 projecting from one of its side faces, and on the same side, the shaft 21 carries a radially extending coin pusher finger 25. The pins 24 are positioned to be intercepted by a hook-shaped, spring-pressed detent 26, which latter, when it engages one of the pins, prevents the feed wheel 17 from being rotated in a direction to feed the stamp strip. The detent 26 and its spring 27 are carried by the plate 22 which faces that side of the feed wheel carrying the pins 24, and this plate also carries a pair of outstanding studs or pins 28 located so as to act as a guide to direct the coin upon the finger 25 which normally rests upon a stop pin 25ª also upon the plate 22 at the same side as that of the pins 28. The pins 28 also guide a coin which has been forced back through the coin slot by the finger 25 upon its return movement when such coin has been prematurely deposited while the finger 25 is at its lowermost position. Should a person attempt to turn the shaft 21 in a reverse direction such movement will be prevented by the finger 25 abutting the stop pin 25ª.

Upon inserting the coin through the slot 16, it drops on the finger 25 and if the shaft 21 is now turned in a direction to carry the coin against the detent 26, it pushes the latter off the pin 24 to unlock the feed wheel 17 and the coin is now pushed against the pin to rotate the feed wheel, the motion of the shaft being thus transmitted to the feed wheel by the pusher finger 25, the coin and the pin 24 engageable by the latter. When the next pin 24 reaches the detent 26, the latter hooks over the same and locks the feed wheel against further rotation. The stamp strip has in the mean time been fed forward the required distance for the removal of two stamps, and the mechanism is now ready for another operation, the coin dropping off the pin 24 to the bottom of the casing as the finger 25 is allowed to return to its normal position.

The shaft 29 carrying the rolls 19 and 20 is supported by bearing arms 30 extending forwardly from strips 31 mounted on the back 10 of the casing and clamped thereto by lateral bends 32 on the inner ends of the plates 22 and 23. Screws or other fasteners 33 pass through the bends 32 and the strips 31, and into the casing back 10.

The stamp rolls 19 and 20 are positioned beneath the feed wheels 17 and 18, and the stamp strips pass upwardly between the feed wheels and resilient presser strips 34 on the back 10 of the casing, to an exit slit 35 in the casing top 13, over which slit extends a hood 36 into which the end of the strip is fed. The hood 36 has a front opening so that the stamps may be grasped and removed, it being understood that the stamp strip is fed a distance of two stamps only at each operation. The front of the hood has a sharp and serrated edge to prevent the insertion of the finger for removal of more than the proper number of stamps at a time. Opposite the slit 35 is a tear-off plate 37 along which the stamps are severed from the strip.

The strips 34 which press the stamp strips against the feed wheels 17 and 18 are held in tension by the back wall 38 of the hood 36 when the latter is secured to the back 10 of the casing, on the outside thereof, it being fastened by screws 39.

The feed wheel 17 has four pins 24 which are spaced ninety degrees apart, and hence the wheel turns a corresponding distance at each operation, this being sufficient to feed a length of strip equal to the length of two stamps. As the feed wheel 18 is designed to feed four one-cent stamps, it must turn a distance of one hundred and eighty degrees, and hence it is fitted with two pins spaced apart this distance.

To the shaft 21 is connected a return spiral spring 40 carried by the outer one of the plates 23, and provided with a strap 41 to limit its expansion, said strap being pivoted, as shown at 42 so that it may be swung clear of the spring, and the outer end of the latter being made fast to said pivot, the same being a screw. That end of the shaft 21 having the operating handle 21ª passes through an aperture in the corresponding casing side 11.

I claim:

1. In a coin-controlled mechanism, a pair of bearing plates a rotary feed-wheel, a rotatable actuator shaft mounted in said bearing plates and on which said wheel is loosely mounted between said plates, pins extending laterally from one of the side faces of the wheel, a coin-pusher extending radially from the shaft on the same side of the wheel as the pins, and a detent upon the plate facing the pin side of the wheel and positioned to successively engage the pins and lock the wheel, the aforesaid shaft being operable to swing the pusher in a direction to push a coin in the direction of the pin engaged by the detent to release the latter and through said pin couple the shaft to the feed wheel for operating the latter.

2. In a coin-controlled mechanism, a rotary feed wheel, a rotatable actuator shaft on which said wheel is loosely mounted, pins extending laterally from one of the side faces of the wheel, a coin-pusher extending radially from the shaft on the same side of the wheel as the pins, a detent positioned to successively engage the pins and lock the wheel, the aforesaid shaft being operable to swing the pusher in a direction to push a coin in the direction of the pin engaged by the detent to release the latter and through said pin couple the shaft to the feed wheel for operating the latter, and a pair of laterally spaced bearing plates for the shaft between which the feed wheel is positioned, one of said plates carrying the detent at a side facing the pin side of the wheel.

3. In a coin-controlled mechanism, a rotary feed wheel, an actuator shaft on which said wheel is loosely mounted, pins extending laterally from one of the side faces of the wheel, a coin-pusher extending radially from the shaft on the same side of the wheel as the pins, a detent positioned to successively engage the pins and lock the wheel, the aforesaid shaft being operable to swing the pusher in a direction to push a coin in the direction of the pin engaged by the detent to release the latter and through said pin operate the feed wheel, and a pair of laterally spaced bearing plates for the shaft between which the feed wheel is positioned, one of said plates carrying the detent and guard pins on said detent-carrying plate positioned to direct a coin upon the coin-pusher of the shaft.

4. In a coin-controlled mechanism, a pair of spaced bearing plates, a rotary feed wheel, a rotatable actuator shaft mounted through said plates and on which said wheel is loosely mounted between said plates, pins extending laterally from one of the side faces of the wheel, a hook shaped coin-pusher extending radially from the shaft on the same side of the wheel as the pins, and a spring-pressed hook upon the side of one of said plates facing the pin side of the wheel and positioned to successively engage the pins and lock the wheel, the aforesaid shaft being operable to swing the pusher in a direction to push a coin in the direction of the pin to engage the bill of the hook and release the same from the pin and through the pins couple the shaft to the feed wheel for operating the latter.

5. In a coin-controlled mechanism, a pair of bearing plates, a rotary feed-wheel, a rotatable actuator shaft on which said wheel is loosely mounted between said plates, pins extending laterally from one of the side faces of the wheel, a coin-pusher extending radially from the shaft on the same side of the wheel as the pins, a detent upon a side of one of said plates facing said pins and positioned to successively engage the pins and lock the wheel, the aforesaid shaft being operable to swing the pusher in a direction to push a coin in the direction of the pin engaged by the detent to release the latter and through said pin couple the shaft to the feed wheel for operating the latter, guard pins upon the plate having the detent and at the same side thereof for directing a coin upon said coin pusher, and means for rotating the shaft in a reverse direction to normal position after its actuation, said guard pins aiding in the ejectment of a prematurely inserted coin by said coin-pusher upon its reverse movement.

In testimony whereof I affix my signature.

KENNETH ELROY KUNS.